United States Patent
Bahrenburg et al.

(10) Patent No.: US 11,218,461 B2
(45) Date of Patent: Jan. 4, 2022

(54) AUTHENTICATING COMPUTING SYSTEM REQUESTS WITH AN UNKNOWN DESTINATION ACROSS TENANTS OF A MULTI-TENANT SYSTEM

(71) Applicant: salesforce.com, inc., San Francisco, CA (US)

(72) Inventors: Matthew Bahrenburg, San Francisco, CA (US); Alan Vangpat, Pittsburgh, PA (US); Anupam Jain, Dublin, CA (US); Koson Thambundit, San Ramon, CA (US); Sanjay Thakkar, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 488 days.

(21) Appl. No.: 16/024,455

(22) Filed: Jun. 29, 2018

(65) Prior Publication Data
US 2020/0007529 A1    Jan. 2, 2020

(51) Int. Cl.
*H04L 29/06*      (2006.01)
*G06F 16/95*      (2019.01)
*H04L 29/08*      (2006.01)
*G06F 21/62*      (2013.01)

(52) U.S. Cl.
CPC .......... *H04L 63/0807* (2013.01); *G06F 16/95* (2019.01); *H04L 63/0442* (2013.01); *H04L 63/0876* (2013.01); *H04L 63/10* (2013.01); *H04L 67/1097* (2013.01); *G06F 21/6218* (2013.01)

(58) Field of Classification Search
CPC ............. H04L 63/0807; H04L 63/0442; H04L 63/0876; H04L 63/10; H04L 67/1097; H04L 63/126; H04L 63/08; H04L 63/104; G06F 16/95; G06F 21/6218; H04W 12/06; H04W 12/08
See application file for complete search history.

(56) References Cited

U.S. PATENT DOCUMENTS 5,577,188 A   11/1996   Zhu
5,608,872 A   3/1997   Schwartz et al.
5,649,104 A   7/1997   Carleton et al.
(Continued)

FOREIGN PATENT DOCUMENTS

EP    2116954    11/2009

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.
(Continued)

*Primary Examiner* — Matthew Smithers
*Assistant Examiner* — Mirza Israr Javed
(74) *Attorney, Agent, or Firm* — Weaver Austin Villeneuve & Sampson LLP

(57) ABSTRACT

Disclosed are some implementations of systems, apparatus, methods and computer program products for facilitating the authentication of computing system requests with an unknown destination across tenants of at least one multi-tenant database system. Authentication is facilitated using an intermediate system that is accessible by and independent from the tenants of the multi-tenant database system.

17 Claims, 9 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,850,219 B2 | 9/2014 | Dapkus et al. |
| 10,306,016 B2 | 5/2019 | Amiri |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2008/0270459 A1* | 10/2008 | Grewal .................. G06Q 10/10 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0282045 A1* | 11/2009 | Hsieh .................. G06F 21/6218 |
| 2010/0306393 A1* | 12/2010 | Appiah .................. G06Q 10/10 709/229 |
| 2011/0218958 A1 | 9/2011 | Warshavsky et al. |
| 2011/0247051 A1 | 10/2011 | Bulumulla et al. |
| 2011/0283110 A1 | 11/2011 | Dapkus et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0074408 A1* | 3/2015 | Oberheide .............. H04L 9/083 713/171 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2017/0293766 A1* | 10/2017 | Schnjakin ............. G06F 21/335 |
| 2017/0300708 A1 | 10/2017 | Gopshtein et al. |
| 2019/0014120 A1 | 1/2019 | Drabant |
| 2019/0236168 A1* | 8/2019 | Vaswani ............. G06F 16/2282 |
| 2019/0340251 A1 | 11/2019 | Peddada et al. |
| 2019/0372766 A1 | 12/2019 | Bahrenburg et al. |
| 2020/0007529 A1* | 1/2020 | Bahrenburg .......... H04W 12/08 |

OTHER PUBLICATIONS

U.S. Appl. No. 15/993,430, filed May 30, 2018, Bahrenburg, et al.
PCT International Search Report and Written Opinion dated Sep. 23, 2019 issued in Application No. PCT/US2019/039607.
U.S. Non-Final Office Action dated Mar. 20, 2020 issued in U.S. Appl. No. 15/993,430.
U.S. Final Office Action dated Aug. 21, 2020 issued in U.S. Appl. No. 15/993,430.
U.S. Notice of Allowance dated Nov. 13, 2020 issued in U.S. Appl. No. 15/993,430.
International Preliminary Report on Patentability (IPRP) dated Jan. 7, 2021.
U.S. Appl. No. 17/249,149, filed Feb. 22, 2021, Bahrenburg, et al.

* cited by examiner

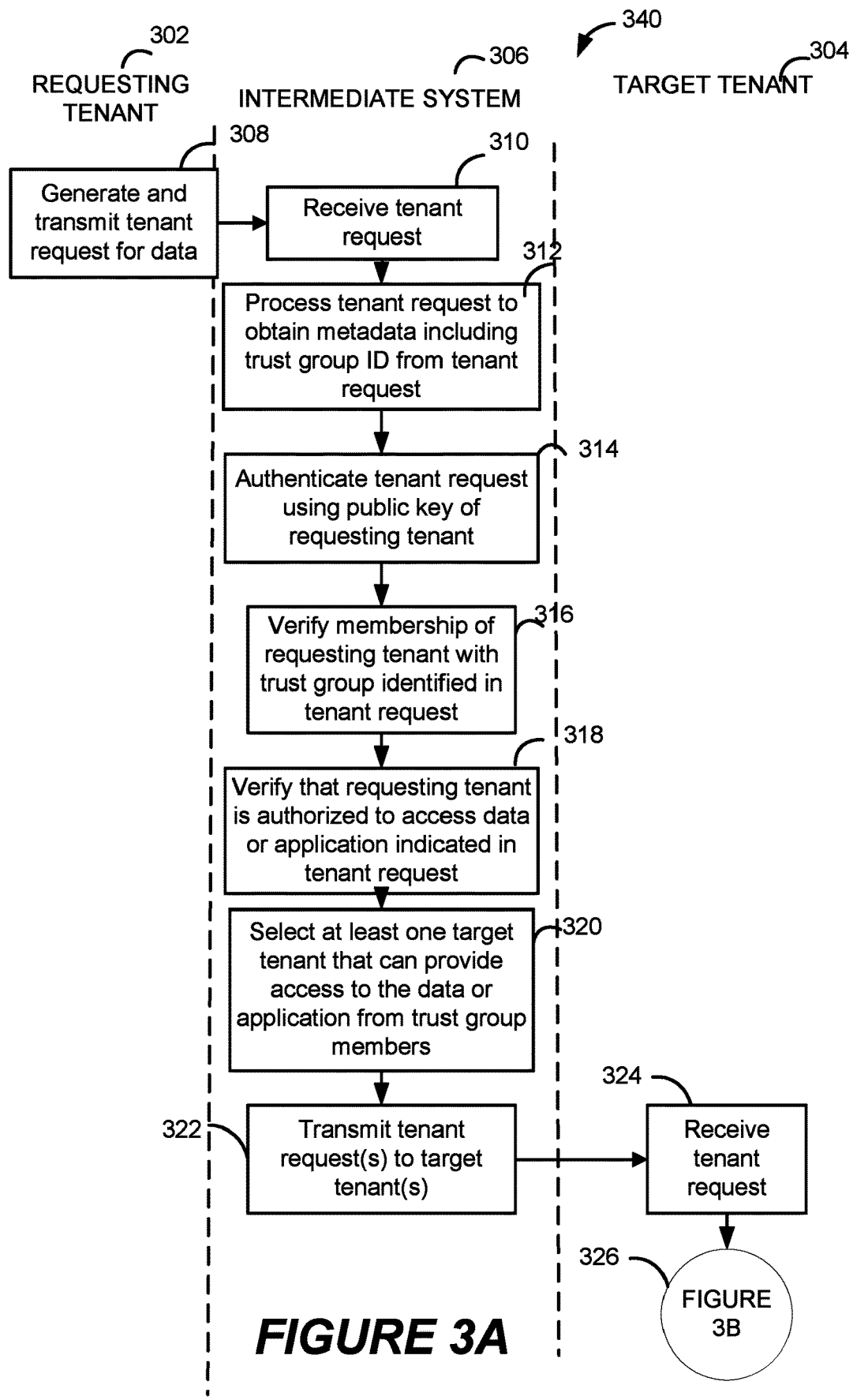

AUTHENTICATING COMPUTING SYSTEM REQUESTS WITH AN UNKNOWN DESTINATION ACROSS TENANTS OF A MULTI-TENANT SYSTEM

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with authenticating computing systems. More specifically, this patent document discloses techniques for using a central computing system to facilitate authenticating computing system requests across tenants of a multi-tenant database system.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed systems, apparatus, methods and computer program products for facilitating authentication of computing system requests across tenants of a multi-tenant database system. These drawings in no way limit any changes in form and detail that may be made by one skilled in the art without departing from the spirit and scope of the disclosed implementations.

FIG. 3A shows a transaction flow diagram of an example of a method 300 for operating a registry to authenticate cross-tenant requests with an unknown destination received from requesting tenants, in accordance with various implementations.

DETAILED DESCRIPTION

Figure 1:
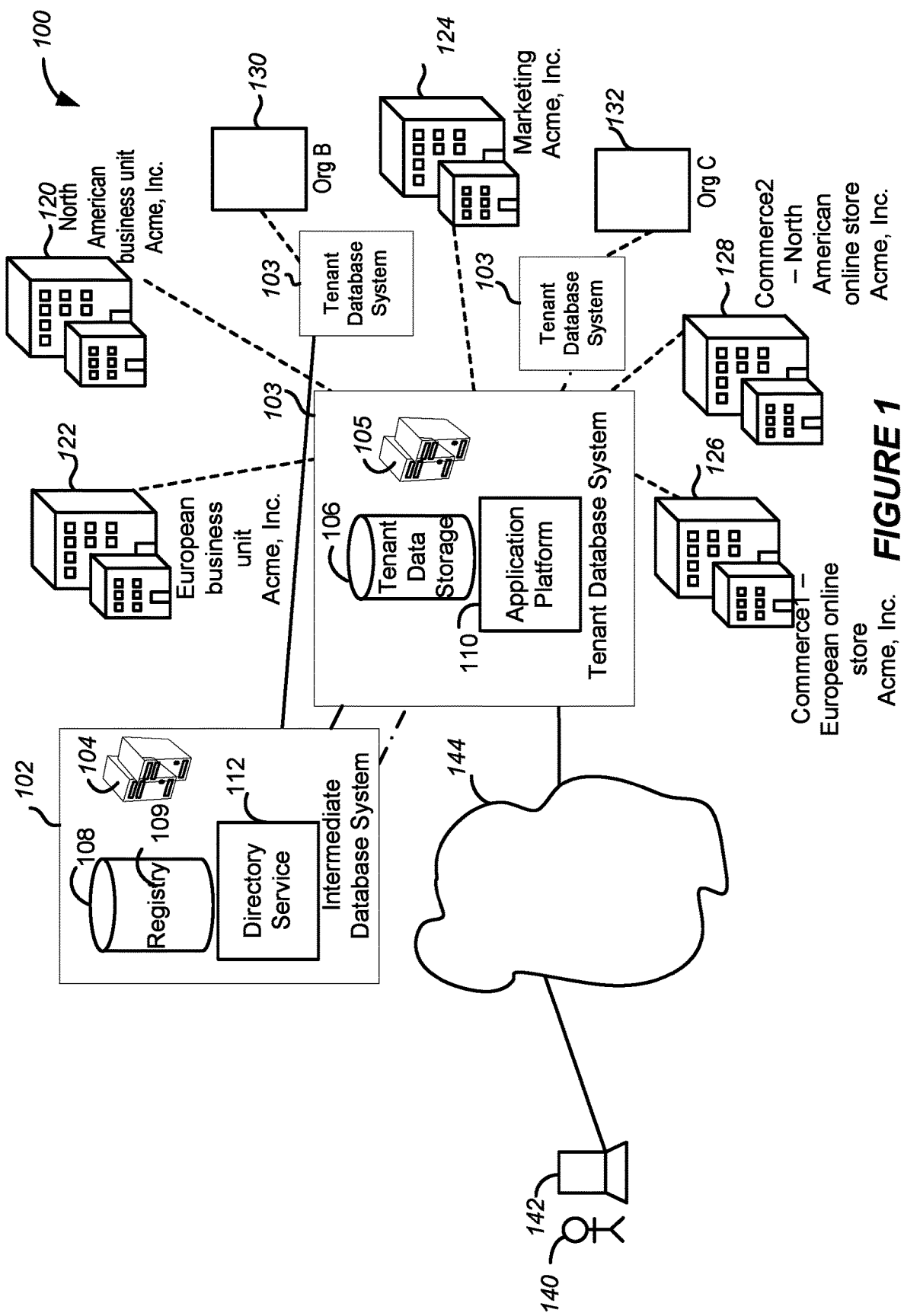
FIG. 1 shows a system diagram of an example of a system 100 in which authentication of computing system requests with an unknown destination sent by tenants in a multi-tenant database system may be facilitated, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations described or referenced herein are directed to different systems, methods, apparatus, and computer program products for authenticating computing system requests across tenant computing systems of at least one tenant database system, where the computing system requests do not identify a particular tenant where data being requested resides. In some implementations, the tenant database system is used to maintain data for each of the tenant computing systems, and the tenant database system can be in the form of at least one multi-tenant database system. The tenants of the tenant database system may include various organizations of users who interact with cloud-based applications running on the tenant database system or on platform(s) associated with the tenant database system.

In database oriented computing systems and environments in which the present techniques can be implemented, the actions of users when interacting with cloud-based applications may cause data to be accessed from the tenant database system, cause data to be generated and stored in the tenant database system, or cause data to be modified in the tenant database system. Non-limiting examples of system events corresponding to user activity include, by way of illustration, a login or a logout, a uniform resource identifier (URI) which may represent a page click and view, an application programming interface (API) call, a record access, a page request, or other type of system request. A system event may be generated in response to any type of user interaction.

Typically, an organization is associated with a single tenant of a multi-tenant database system. Thus, while the multi-tenant database system may support multiple organizations, it is typically assumed that a tenant may not access data of another tenant stored within the multi-tenant database system. Therefore, there has not been a need for tenants to authenticate data requests transmitted by other tenants.

In some implementations, an organization may be associated with two or more tenants of one or more multi-tenant database systems. These tenants may be in the same multi-tenant database system, or in different multi-tenant database systems. The multi-tenant database systems may be configured to support the sharing of data between the tenants of the organization while preventing unauthorized data access. For example, a multi-tenant database system may be configured to allow access by a tenant of one organization of data of another tenant associated the organization or a different organization, when such access would normally not be allowed. This is accomplished, in part, by implementing an intermediate database system configured to facilitate authentication of system requests including tenant requests sent across tenants of the multi-tenant database system(s).

A tenant of the multi-tenant database system, during execution of an application, may request data that is stored in the multi-tenant database system. The tenant may have knowledge of where data of interest resides. In these instances, the tenant may request data from a particular tenant of the multi-tenant database system. In the following description, a tenant that is requesting data will be referred to as a requesting tenant, while a tenant that is receiving and processing a tenant request for data will be referred to as a target tenant. A request for data that is transmitted to a target tenant will be referred to as a tenant request. As will be described in further detail below, the tenant request may be sent directly to the target tenant by the requesting tenant or may be forwarded to the target tenant by an intermediate system that selects the target tenant.

In some instances, the tenant may be unaware of where data of interest resides. In other words, the tenant does not know the identity of a particular tenant that is capable of satisfying its request. Therefore, the tenant may be unable to obtain the data of interest.

In accordance with various implementations, a requesting tenant may request data from an entity other than a particular tenant. For example, the tenant may be able to identify at least one business unit of the organization from which it can obtain the data. In these instances, the tenant may direct its request for data to a known entity such as a business unit, where the known entity is associated with or includes a particular set of tenants of the distributed multi-tenant database system. The set of tenants will be referred to in the following description as a group of tenants.

In some implementations, tenants of at least one distributed multi-tenant database system can be authenticated and share data without requiring a requesting tenant to have knowledge of where specific data it is requesting resides. This is accomplished using trust groups, where each trust group includes two or more members that are tenants of the distributed multi-tenant database system(s). For example, a particular trust group may be identified by a business unit name or other identifier associated with the business unit. As another example, a trust group may be associated with all business units of the organization. Therefore, a requesting tenant may request data from a particular trust group rather than a specific tenant.

In accordance with various implementations, the intermediate database system receives and processes tenant requests that are directed to a trust group. In some implementations, the intermediate database system is configured to process only tenant requests directed to trust groups.

In accordance with various implementations, the intermediate database system is configured identify a particular trust group to which a tenant request is directed and select a tenant member of the particular trust group that is capable of satisfying the tenant request. For example, the intermediate system may select a target tenant on which the requested data resides. The intermediate database system may then forward the tenant request to the selected target tenant. For example, the intermediate database system may encapsulate the tenant request with an identifier and/or address of the selected target tenant, as well as an identifier and/or address of the intermediate database system. Upon receiving the tenant request, the target tenant may communicate with the intermediate database system, as will be described in further detail below. In the following description, a tenant that is requesting data from another tenant or requesting information such as metadata from the intermediate database system will be referred to as a sending tenant, while a request for data, metadata, or other information that is transmitted by the sending tenant or receiving tenant to the intermediate system will be referred to as a system request.

In accordance with various implementations, the intermediate database system is configured to facilitate authentication of system requests it receives from tenants including target tenants. In some implementations, authentication includes verifying the identity of the sending tenant. More particularly, authentication can include verifying the identity of the requesting tenant that sent the tenant request. In addition, authentication can include verifying the identity of a tenant that has sent a system request to the intermediate system. Authentication may be accomplished using asymmetric keys to generate a signature that is used to authenticate the system request. In some implementations, part of the system request (e.g., tenant request) may be encrypted to prevent tampering with the request and the intermediate database system facilitates decryption of the system request.

In some implementations, the intermediate database system is configured to determine whether the requesting and/or target tenant has a trust relationship with the particular trust group. This may be accomplished, for example, by ensuring that the requesting tenant is a member of the trust group. For example, the intermediate database system may look up an identifier of the requesting tenant in a list of members of the particular trust group. As another example, the intermediate database system may apply a set of membership rules associated with the particular trust group to determine whether the requesting tenant is a member of the particular trust group.

In some implementations, the intermediate database system is further configured to facilitate authorization of the requesting tenant to access the requested data (or application). This may be accomplished, for example, by authorizing the requesting tenant to access data of the tenant/trust group based upon a set of permissions and a context of the request. For example, the context may include an application of the requesting tenant that initiated the request and/or an application of the tenant/trust group to which the request is addressed.

By way of illustration, Acme Corporation may purchase five tenants across three different multi-tenant database systems: Marketing, Commerce, and Core (e.g., Service). A first one of these tenants is implemented as an instance of Marketing, a second one of these tenants is implemented as an instance of Commerce (e.g., an online store) for their North American business unit, and a third one of these tenants is implemented as an instance of Commerce for their European business unit. An additional two tenants may be implemented as Core instances that facilitate managing a corresponding business unit. These tenants typically are used and handle data independently.

As Acme Corporation expands, the corporation purchases additional tenants for their European business unit. In addition, the corporation purchases further tenants for additional business units as the corporation expands into other countries.

An employee of Acme Corporation, Randall, working in the Marketing Department is responsible for creating a marketing campaign for Acme Corporation. Randall would like to access a list of customers that purchased products from Acme's European business unit. Randall asks his employees to write an application that accesses the list of all customers that have purchased products from the European business unit. More particularly, the Marketing Department would like to execute the application to obtain addresses and demographic information for all of the customers of Acme Corporation that have purchased products from the European online store. The application requests this information from a trust group associated with European business unit, where the trust group includes all of the tenants of the European business unit. Through the use of a trust group, the Marketing Department need not have knowledge of all tenants purchased by Acme Corporation on behalf of the European business unit.

A multi-tenant database system typically supports tenants of multiple organizations or companies. As a result, the multi-tenant database system cannot freely allow database access between all tenants. To protect sensitive customer data from being accessed by tenants outside the Acme Corporation, the intermediate database system may facilitate authentication of cross-tenant requests sent to specific tenants or trust groups.

In this example, the intermediate system receives a system request transmitted by the application executed by the Marketing. The intermediate system ascertains that the request targets the European business unit, identifies each of the tenant(s) of the European business unit that stores customer information for the European business unit, selects at least one of the identified tenants, and sends the request for customer data to the selected tenant(s) of the European business unit. In addition, the intermediate system may verify that the Marketing tenant is permitted to request data from the European business unit.

A computing system of each of the selected tenants of the European business unit receives the request for customer data. Each of the selected tenants communicates with the intermediate system to authenticate the data request using a public key of the Marketing tenant maintained by the intermediate system to ensure that the request is issued by a known tenant (the Marketing tenant). The intermediate system also verifies that the Marketing tenant is allowed to initiate requests to the European business unit and is permitted to access the requested data. For example, the intermediate system may ensure that the application requesting customer information for the European business unit is authorized to view that specific data.

In accordance with various implementations, authentication is facilitated by an intermediate database system that stores security access keys for all tenants of an organization and maintains knowledge of trust group memberships and tenant relationships. Tenant relationships may include tenant-tenant relationships and/or tenant-trust group relationships. In some implementations, the intermediate database system stores security access keys for tenants of multiple organizations. In some implementations, the intermediate database system stores metadata that governs tenant relationships. The metadata may identify permitted relationships, as well as those contexts under which data access is permitted, as will be described in further detail below.

FIG. 1 shows a system diagram of an example of a system 100 in which authentication of computing system requests with an unknown destination sent by tenants in a multi-tenant database system may be facilitated, in accordance with some implementations. In FIG. 1, an intermediate database system 102 includes any number of computing devices such as servers 104. The servers 104 are in communication with one or more storage mediums 108 configured to store and maintain relevant metadata used to perform some of the techniques disclosed herein. In this example, the storage mediums 108 include a registry 109 that stores registry information including metadata that supports authentication of tenant requests. For example, the registry information can include public keys associated with individual tenants and/or trust groups. An example of a registry will be described in further detail below with reference to FIGS. 2A-2B.

The intermediate database system 102 also includes a directory service 112 configured to access and/or communicate with the registry 109 to facilitate the sharing of data between tenants and authentication of tenant requests. The directory service 112 is also configured to communicate with tenants of the system 100, as described herein. In accordance with various implementations, tenants of the system 100 cannot directly access the registry 109.

The storage mediums 108 may further store computer-readable instructions configured to perform some of the techniques described herein. In addition, the database system 102 may include a platform having hardware and/or software, e.g., the operating system, which may be configured to perform some of the techniques described herein.

Various tenants of the system 100 are supported by one or more tenant database systems. For example, a tenant database system may include a multi-tenant database system. The tenant database systems may be independent from or integral with the intermediate database system 102. Each tenant database system 103 may support a group of tenants. In this example, three different independent tenant database systems 103 are shown. Each tenant database system 103 may communicate with the intermediate database system 102, as described herein.

Each tenant database system 103 includes any number of computing devices such as servers 105. The servers 105 are in communication with one or more storage mediums configured to store and maintain tenant data generated by or otherwise maintained by tenants of the tenant database system 103. In this example, the storage mediums include tenant data storage 106. For example, the tenant data storage 106 can store data for each tenant of one or more multi-tenant database(s).

Tenant storage of the multi-tenant database system may further store computer-readable instructions used by tenants to perform some of the techniques disclosed herein. In addition, the tenant storage may store metadata or other information received and/or generated by the tenants as described herein.

An application platform 110 of the tenant database system 103 may be a framework that allows applications of the tenant database system 103 to run. For example, the application platform may include hardware and/or software, e.g., the operating system. In some implementations, the application platform 110 supports the creation, managing and executing of one or more applications.

Directory service 112 is configured to respond to tenant requests for information from the registry 109, as will be described in further detail below. In some implementations, the directory service 112 is implemented by a tenant of the tenant database system 103. In some implementations, the directory service 112 is configured to update the registry 109 to store registry information responsive to receiving the registry information from one or more tenants of the tenant database system 103. In some implementations, a tenant may transmit registry information to the directory service 112 during a registration process. In some implementations, a tenant may publish its registry information to the registry 109 or directory service 112. In some implementations, the registry 109 may be manually configured.

In some implementations, the tenant database system 103 is configured to store privilege information identifying or specifying access rights and restrictions of users according to various attributes such as a specified user ID, type of user, role of user, a community to which the user belongs, and/or a particular organization on behalf of which a community is maintained. Each of the communities may be operated on behalf of an organization. Each organization may have associated therewith one or more tenants, which may each be associated with one or more communities.

In FIG. 1, tenants 120, 122, 124, 126, and 128 are operated on behalf of Org A, which in this example is Acme Corporation. Tenant 130 is operated on behalf of Org B and tenant 132 is operated on behalf of Org C. In FIG. 1, tenant 120 is operated on behalf of Acme Corporation's North American core business unit, tenant 122 is operated on behalf of Acme Corporation's European core business unit, tenant 124 is operated on behalf of Acme Corporation's Marketing operations, tenant 126 is operated on behalf of Acme Corporation's European online store, and tenant 128 is operated on behalf of Acme Corporation's North American online store.

A user 140 employed by an organization may access a login page at a uniform resource locator (URL). Once logged in, the user may use an application within a tenant of the organization such as Commerce tenant 126, using a suitable computing device 142 such as a personal computer, laptop, tablet or smartphone via network 144. While using this application, the application may request access to data from another tenant of the organization such as the Core tenant 122. This data access may be controlled by the relevant privilege information and the directory service 112, which accesses and applies registry information stored in the registry 109, as will be described in further detail below.

Figures 2A, 2B:
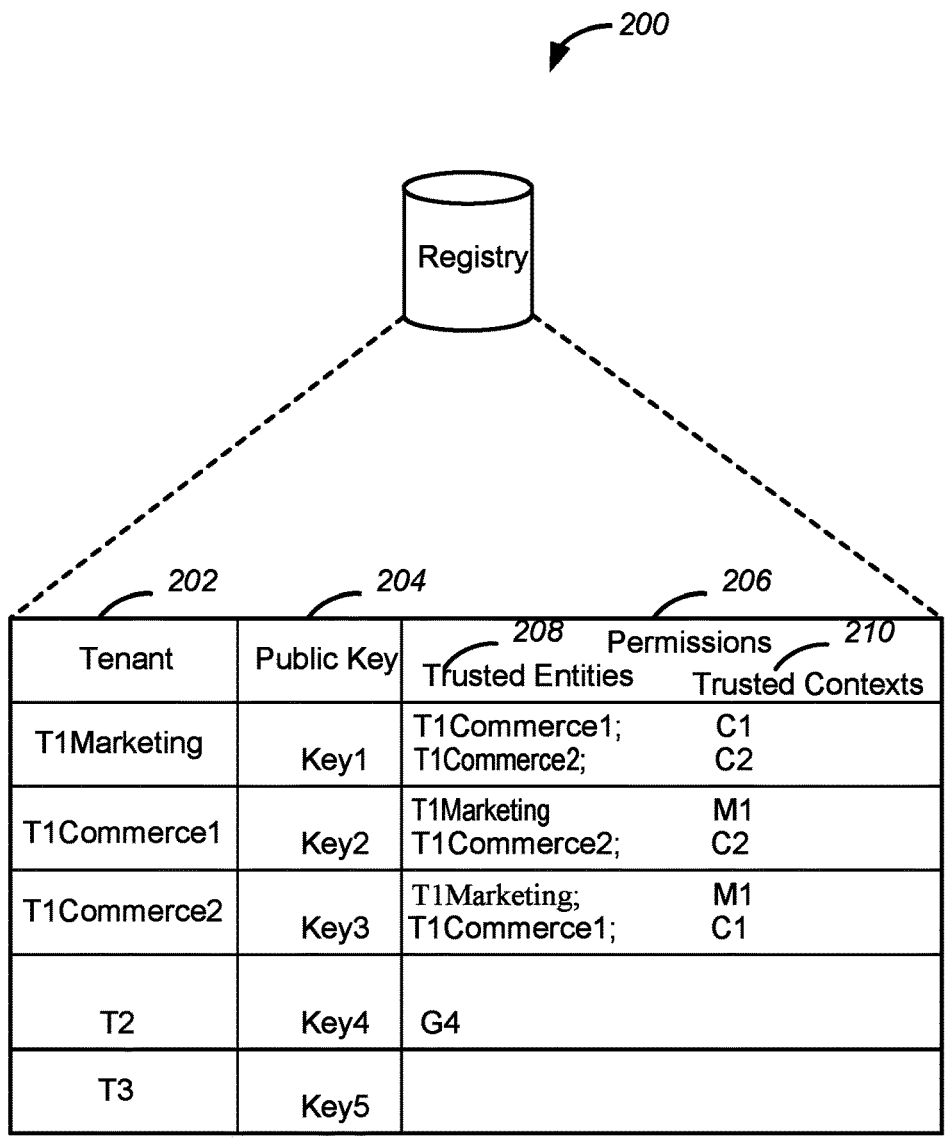
FIG. 2A shows an example of a registry 200 that may be implemented, in accordance with various implementations.
FIG. 2B shows an example of trust group membership metadata 220 of a registry 200 that may be implemented, in accordance with various implementations.

FIG. 2A shows an example of a registry 200 that may be implemented, in accordance with various implementations. The registry 200 may store registry information including metadata corresponding to a plurality of tenants and/or trust groups of the tenant database system 103. For example, the registry 200 may include one or more database tables that store metadata in fields of the database tables.

Registry information associated with a tenant or trust group may include, but is not limited to, a public key of the corresponding tenant, a set of permissions governing which tenants are authorized to access data of the tenant/trust group from the tenant data storage, and/or contexts in which the authorized tenants may access data of the tenant/trust group from the tenant storage. Contexts may include, but are not limited to, an application of the requesting tenant, an application of the target tenant/trust group, a category of data (e.g., customers, leads, contacts), specific data records, and/or specific data fields.

The registry 200 may include an identifier 202, which may be a tenant identifier as shown in this example. More particularly, the registry may include the identifier 202 for each of the tenants of the tenant database system 103. As shown in this example, the metadata of the registry 200 may indicate, for each tenant 202 of the tenant database system 103, a public key 204. In some implementations, the registry 200 does not store private keys for the tenants to ensure that the private keys remain secure. In other implementations, the registry 200 may further store a private key for each of the tenants 202.

The metadata of the registry may include or otherwise indicate, for each tenant 202 of the tenant database system 103, a corresponding set of permissions 206. The set of permissions 206 may indicate a set of trusted entities (e.g., tenants and/or trust groups) 208 that are trusted by the corresponding tenant 202. More particularly, each of the trusted entities 208 may be represented within the registry 200 by a corresponding tenant identifier or group identifier identifying a trust group. In other words, the set of permissions 206 may indicate those tenant-tenant and/or tenant-group relationships that are trusted. In addition, for each tenant and/or trust group in the set of trusted entities 208, the registry 200 may indicate a set of contexts that are trusted. In this example, the registry 200 indicates, for each of the trusted entities 208, one or more trusted contexts 210 (e.g., applications of the corresponding trusted tenant or trust group). In some implementations, the registry 200 may indicate, for each of the trusted entities, data that is accessible from that tenant or trust group. For example, the registry 200 may indicate, for each of the applications that are trusted, data that is accessible from the target entity (e.g., tenant/trust group). Data that is accessible from the target entity may be represented, for example, by an identifier of an application of the target entity, a particular type or category of data, and/or a field identifier of one or more fields of database(s) maintained in association with the target entity in one or more multi-tenant databases of the tenant database system 103.

A set of permissions may be represented in the form of one or more rules. A rule may include one or more operators such as AND, OR, NOT, etc. A set of rules may be associated with one or more tenants. In some implementations, a set of rules indicates tenant relationships that are trusted, as well as those tenant relationships that are not trusted. For example, the set of rules may be applied to identify those tenant relationships that are trusted. A set of rules may further indicate contexts that are trusted for a given tenant relationship.

In accordance with some implementations, the public keys are stored in the registry 200 and are not configured on any of the corresponding tenants 202. In some implementations, each of the tenants 202 maintains more sensitive tenant information such as its own private key in a data store that is local to that tenant 202. In some implementations, this sensitive tenant information (e.g., private key) that is stored locally to the tenant 202 is not stored in the registry 200.

In this example, the registry 200 stores metadata corresponding to tenants of the tenant database system 103. In some implementations, the registry 200 may also store metadata corresponding to trust groups. For example, the registry 200 may store a group identifier that identifies a particular trust group, and/or permissions associated with the trust group. In accordance with various implementations, the registry 200 is stored in a database. More particularly, the registry 200 may be stored in one or more database tables. As shown in FIG. 2A, a database table may include, for each tenant 202, one or more database entries corresponding to one or more database fields of the database table. For example, each row in the database table may correspond to a different tenant of the multi-tenant database system. In this example, three tenants are operated on behalf of a first organization, Org1. In FIG. 2A, these tenants are identified as T1Marketing, T1Commerce1, and T1Commerce2. In addition, tenants T2 and T3 are each operated on behalf of a different organization, Org2 and Org3, respectively.

In this example, the registry 200 identifies two trusted tenants for each of the tenants of the organization, Org1. More particularly, as shown in FIG. 2A, the trusted entities 208 for the tenant T1Marketing include T1Commerce1 and T1Commerce2; the trusted entities 208 for the tenant T1Commerce1 include T1Marketing and T1Commerce2; the trusted entities 208 for the tenant T1Commerce2 include T1Marketing and T1Commerce1; the trusted entities 208 for the tenant T2 include members of group G4. Tenants that are not identified as trusted tenants or are not members of a trusted group are not authorized to access data of the corresponding tenant 202.

In some implementations, the registry 200 may further identify or otherwise indicate, for each of the trusted entities 208, a corresponding set of trusted contexts 210 (e.g., specific data/applications). As shown in FIG. 2A, for the tenant T1 Marketing, requests for data are authorized for the trusted tenant T1Commerce1 under the context C1 and for the trusted tenant T1Commerce2 under the context C2. For the tenant T1Commerce1, requests for data are authorized for the trusted tenant T1Marketing under the context M1 and for the trusted tenant T1Commerce2 under the context C2. For the tenant T1Commerce2, requests for data are authorized for the trusted tenant T1Marketing under the context M1 and for the trusted tenant T1Commerce1 under the context C1.

Where an organization has associated therewith a single tenant, the registry 200 may indicate that there are no trusted entities that are authorized to access data of the organization. Alternatively, the registry 200 may indicate tenants of other organizations that are authorized to access data of the organization. In this example, the registry 200 indicates that members of group G4 are authorized to access data of tenant T2 of Org2. The registry 200 indicates that there are no trusted entities for tenant T3.

In addition, the registry 200 may further store metadata that correlates data and/or applications with specific tenant(s) that store the data and/or provide access to the applications. For example, the metadata may associate specific database tables, fields of the database tables, and/or application APIs with corresponding tenant(s).

In some implementations, the registry 200 further identifies or otherwise indicates all members of a trust group, as will be described in further detail with reference to FIG. 2B. Each trust group includes multiple tenants. The members of a particular trust group have a trust relationship with one another and are permitted to request data from other members of the trust group. Trust group membership for a given trust group may be static or dynamic.

FIG. 2B shows an example of trust group membership metadata 220 of a registry 200 that may be implemented, in accordance with various implementations. As shown in FIG. 2B, trust group membership metadata 220 indicates, for each trust group 222, tenant members 224 of the trust group 222. A trust group 220 may be identified by a corresponding trust group identifier. In this example, trust groups G1, G2, G3, and G4 are identified.

Group membership 224 for a given trust group 222 may be designated via a list of one or more members and/or a set of membership rules. A rule may include one or more operators such as AND, OR, NOT, etc. In this example, group members of Group G1 are identified in a list, which identifies tenants T1Commerce1 and T1Commerce2. Group members of group G2 are also identified in a list, which identifies T1Marketing, T1Commerce1, and T1Commerce2. Group members of group G3 are identified via a corresponding set of membership rules, which indicates that all commerce tenants of Org1 are members of group G3. Similarly, group members of group G4 are identified via a corresponding set of membership rules, which indicates that all commerce tenants of Org2 are members of group G4.

In accordance with various implementations, the registry 200 may be accessed by components of the intermediate database system 103 responsive to receiving a system request from a tenant. More particularly, the intermediate database system 102 processes system requests received from computing systems of tenants, as will be described in further detail below.

Figure 3B:
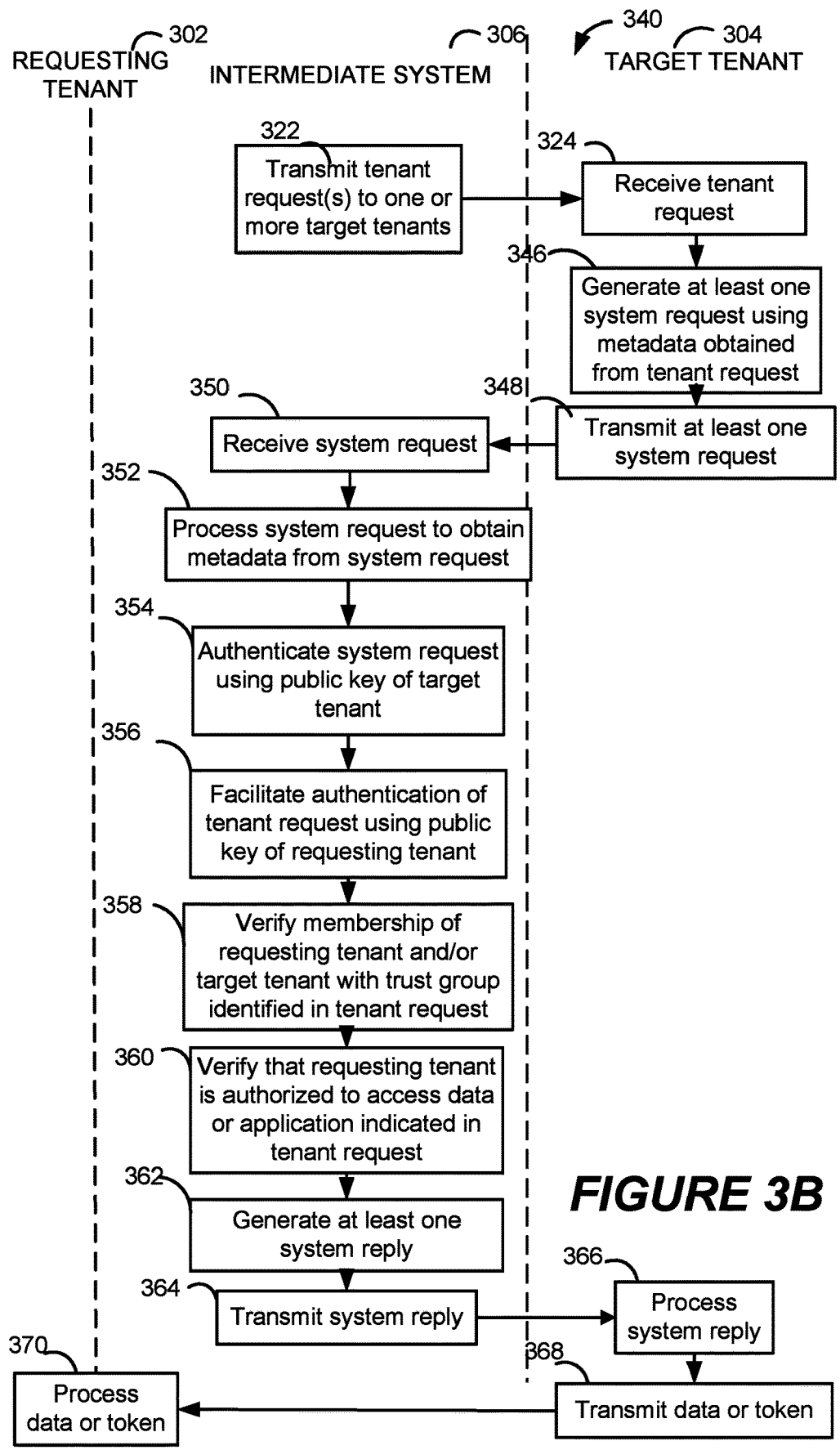
FIG. 3B shows a transaction flow diagram of an example of another method 340 for operating a registry to authenticate cross-tenant requests in response to system requests received from target tenants selected by an intermediate system, in accordance with various implementations.

FIGS. 3A-3B together illustrate an example of a method of authenticating tenant requests with an unknown destination. More particularly, an example of a method of interaction between an intermediate system and a requesting tenant is shown and described with reference to FIG. 3A, while an example of a method of interaction between the intermediate system and a target tenant is shown and described with reference to FIG. 3B.

FIG. 3A shows a transaction flow diagram of an example of a method 300 for operating a registry to authenticate tenant requests with an unknown destination received from requesting tenants, in accordance with various implementations. In the following description, a computing system of a tenant that sends a request for data will be referred to as a requesting tenant 302, while a computing system of a tenant that receives the request for data will be referred to as a target tenant 304. Authentication of cross-tenant requests will be described in relation to an intermediate system 306, which may implement a directory service and associated registry. A request for data that is transmitted to a target tenant will be referred to as a tenant request, while a request for metadata that is transmitted to the directory service/registry will be referred to as a registry request.

The requesting tenant 302 may generate a tenant request directed to a particular trust group and transmit a system request including the tenant request at 308. More particularly, the requesting tenant 302 may generate the system request by encapsulating the tenant request with an address associated with the intermediate system and transmit the system request to the intermediate system. For example, an application executing on a server of the requesting tenant may request access to data having particular characteristics and/or may request access to a particular application, but may be unaware of the specific tenant from which the data and/or application can be accessed.

The tenant request may include an identifier of the requesting tenant, an identifier of the trust group to which the tenant request is directed, and an indication of data or an application to which the requesting tenant requests access. For example, the indication of data may take the form of an Application Programming Interface (API) call. In addition, the tenant request may include an indication of a context in which the data is being requested. In some implementations, the tenant request includes a JavaScript Object Notation (JSON) web token.

In some implementations, the trust group identifier may include alphanumeric text identifying the particular trust group. In other implementations, the group identifier may include a group address (e.g., IP address) associated with the particular trust group.

The requesting tenant may generate a digital signature using the private key of the requesting tenant and appends the digital signature to the tenant request. In addition, the requesting tenant may encrypt at least a portion of the tenant request using its private key prior to transmitting the tenant request. For example, the requesting tenant may use its private key to encrypt the tenant request or portion thereof. In some implementations, a requesting tenant may access its public and/or private key from the intermediate system.

In some implementations, the requesting tenant addresses the tenant request to a group address (e.g., IP address) associated with the trust group. More particularly, the requesting tenant may be configured with or otherwise obtain the group address. The group address may be an address of a system component or a virtual group address associated with one or more system components. The system components associated with the virtual group address may be static or dynamic In some implementations, the requesting tenant sends the tenant request directly to the intermediate system. More particularly, the requesting tenant may send the tenant request to an address associated with the intermediate system. The requesting tenant may be configured with or otherwise obtain the address of the intermediate system. The address of the intermediate system may be an address of a system component of the intermediate system. Alternatively, the address of the intermediate system may be a virtual address associated with the intermediate system, where the virtual address is associated with one or more system components. The system components associated with the virtual address may be static or dynamic.

The intermediate system intercepts or otherwise receives the tenant request at 310 and processes the tenant request at 312. More particularly, the intermediate system obtains information from the tenant request so that it can identify a tenant that can fulfill the tenant request. For example, the intermediate system may obtain metadata including a trust group identifier and an identifier of the requesting tenant from the tenant request. In addition, the target tenant may obtain an indication of the data being requested and/or an indication of the context in which the data is being requested from the tenant request.

The intermediate system may authenticate the tenant request using a public key of the requesting tenant at 314. More particularly, the intermediate system may retrieve the public key of the requesting tenant from the registry and authenticate the tenant request using the public key of the requesting tenant, as described herein. For example, the intermediate may validate the signature of the tenant request using the public key and decrypt the tenant request, as appropriate.

In some implementations, the intermediate system performs verification processes prior to forwarding the tenant request to a particular target tenant. For example, the intermediate system may determine whether to forward the tenant request based upon a result of the verification processes. Example verification processes are shown in this example at 316 and 318. The intermediate system may verify that the requesting tenant is permitted to send data requests to the trust group identified in the tenant request. For example, the intermediate system may verify that the requesting tenant is a member of the trust group identified in the tenant request at 316 using the registry. More particularly, the intermediate system may access the group membership information associated with the trust group and apply the group membership information to determine whether requesting tenant is a member of the trust group.

The intermediate system may also verify that the requesting tenant is authorized to access the data or application indicated in the tenant request at 318 using the registry. More particularly, the intermediate system may apply a set of permissions associated with the requesting tenant, maintained in the registry, to determine whether the requesting tenant is permitted to access the data or application.

The intermediate system may select a tenant that can satisfy the tenant request at 320 using the registry. More particularly, the intermediary system may identify tenant member(s) of the trust group that can provide the requested data or provide access to the application via which the data can be obtained. The intermediate system may select at least one target tenant from the identified members that can satisfy the tenant request.

The intermediate system may then send the tenant request(s) to the selected target tenant(s) at 322. For example, the intermediate system may forward the tenant request to the selected target tenant(s). In the event that the tenant request cannot be satisfied by a single target tenant, the intermediate system sends tenant requests to the target tenants, as appropriate. This may include forwarding a tenant request, modifying and sending a tenant request, and/or transmitting additional information in association with the tenant request to a target tenant.

The target tenant receives the tenant request at 324 and the target tenant communicates with the intermediate system to authenticate the tenant request at 326, as will be described in further detail below with reference to FIG. 3B.

FIG. 3B shows a transaction flow diagram of another example of a method 340 for operating a registry to authenticate cross-tenant requests in response to system requests received from target tenants selected by the intermediate system, in accordance with various implementations. After receiving the tenant request from the intermediate system, the target tenant may generate at least one system request (e.g., registry request) at 346 using metadata obtained from the tenant request. For example, the system request may include the tenant request or metadata obtained from the tenant request. The metadata may include, for example, an identifier of the requesting tenant, an indication of the data being requested and/or an indication of the context in which the data is being requested from the tenant request. The target tenant then transmits the system request to the intermediate system at 348 so that the tenant request it has received can be authenticated and/or decrypted and the target tenant to verify that the requesting tenant is authorized to access the requested data.

In some implementations, the target tenant may generate a single registry request. For example, the target tenant may encapsulate and forward the tenant request to the directory service. In other implementations, the target tenant may generate two or more registry requests.

For example, the target tenant may be unable to ascertain the data being requested and/or the context in which the data is being requested from the tenant request until the tenant request is decrypted. In some implementations, the target tenant generates a first registry request to facilitate the authentication of the tenant request and transmits the first registry request to the directory service. Authentication of the tenant request may be performed by the directory service and/or the target tenant. More particularly, the first registry request may request the public key of the requesting tenant so that the target tenant can validate the signature of the tenant request and/or decrypt the tenant request. Alternatively, the first registry request may request that the directory service authenticate the tenant request, which may be encapsulated within the first registry request. The directory service may validate the signature of the request and/or decrypt the tenant request using the public key of the requesting tenant.

The directory service receives the system request at 350 and processes the system request at 352 to obtain metadata from the system request. More particularly, the directory service may process the system request to obtain metadata from a header of the system request. For example, the metadata may include an identifier of the target tenant and an indication of the encryption algorithm used to encrypt the system request.

In some implementations, the directory service authenticates the system request at 354 to verify that the system request has been composed by the target tenant identified within the system request. More particularly, the directory service may retrieve a public key of the target tenant from the registry and authenticate the registry request using the public key of the target tenant. For example, the directory service may perform a lookup in the registry using an identifier of the target tenant to obtain the public key of the target tenant and validate the signature of the registry request according to the encryption algorithm indicated within the metadata of the registry request.

After the directory service has successfully authenticated the registry request, the directory may facilitate the authentication of the tenant request received by the target tenant at 356. More particularly, the directory service may obtain metadata including the public key of the requesting tenant from the registry. For example, the directory service may perform a lookup in the registry using an identifier of the requesting tenant to obtain the public key of the requesting tenant.

The directory service may facilitate authentication of the tenant request using the public key of the requesting tenant. In some implementations, the directory service may authenticate the tenant request (e.g., where the target tenant forwards the tenant request to the directory service). The directory service may then generate and transmit a registry reply indicating whether authentication of the tenant request was successful to the target tenant. In other implementations, the directory service may transmit the public key of the requesting tenant to the target tenant so that the target tenant can authenticate the tenant request using the public key.

In some implementations, the intermediate system performs verification processes in response to a system request received from a target tenant. For example, the target tenant that has received the tenant request may communicate with the intermediate system to determine whether to provide access to the requested data and/or application. Example verification processes are shown in this example at 358 and 360.

In some implementations, the directory service verifies that the requesting tenant and/or target tenant are members of the trust group identified in the system request at 358. More particularly, the directory service may ascertain, from the system request, the identity of the trust group to which the tenant request was directed and verify that the target tenant trusts the requesting tenant or the trust group to which the requesting tenant belongs. For example, the directory service may verify that the requesting tenant is a member of the trust group identified in the tenant request using the registry. As described above, the directory service may access the group membership information associated with the trust group and apply the group membership information to determine whether requesting tenant is a member of the trust group.

In addition, in some implementations, the directory service may also verify that the requesting tenant is authorized to access the requested data or application, as indicated in the system request, using the registry at 360. More particularly, the intermediate system may apply a set of permissions associated with the requesting tenant and/or the target tenant, maintained in the registry, to determine whether the requesting tenant is permitted to access the data or application. The set of permissions may be retrieved by looking up an identifier of the target tenant and/or an identifier of the requesting tenant.

The directory service may generate at least one system reply (e.g., registry reply) at 362 and transmit the system reply to the target tenant at 364. In some implementations, the directory service generates a single system reply. In other implementations, the directory service generates two or more system replies, where each system reply includes information corresponding to a different system request. For example, the directory service may generate a first system reply in association with authentication of the tenant request (e.g., responsive to a first system request) and a second system reply in association with authorization of the requesting tenant to access the requested data or application of the target tenant.

The system reply may include a public key of the requesting tenant or indicate whether authentication of the tenant request was successful. In addition, in some implementations, the system reply may indicate whether the requesting tenant is authorized to access the data or application from the target tenant and/or whether the target tenant is a member of the trust group. In some implementations, the system reply may include metadata that enables the target tenant to ascertain whether the requesting tenant is permitted to access the data or application from the target tenant. For example, the metadata can include a set of permissions or portion thereof, trust group membership information or a portion thereof, and/or other pertinent metadata. As described above, the metadata may include one or more rules that can be applied by the target tenant.

In some implementations, the system reply may further indicate whether data of the target tenant may be accessed under a particular context indicated in the system request. For example, the system reply may indicate whether an application of the requesting tenant is trusted. As described above, the context may include a particular application, specific data, a category of data, specific data record(s) and/or field(s).

The intermediate system transmits the system reply to the target tenant at 364. The target tenant may process the system reply at 366 to verify that the tenant request is successfully authenticated and the requesting tenant is authorized to access the data or application from the target tenant. In this example, a single system reply is represented to simplify the illustration. However, the target tenant may process any number of replies as described herein.

After determining that the tenant request has been successfully authenticated and that the requesting tenant is authorized to access data of the target tenant as requested in the tenant request, the target tenant may fulfill the tenant request by transmitting the requested data or a token at 368. In some implementations, the target tenant may transmit requested data to the requesting tenant. In other implementations, the target tenant may generate and transmit a token to the requesting tenant so that the requesting tenant may use the token to access data of the requesting tenant (e.g., via an application of the target tenant). In yet other implementations, the target tenant may transmit the requested data or token to the intermediate system, which forwards the data or token to the requesting tenant. The requesting tenant may then process the data or token at 370.

In this example, the target tenant is described as generating a single registry request. However, it is important to note that these examples are merely illustrative. Therefore, the target tenant may generate any number of registry requests in association with a single tenant request.

Figure 4:
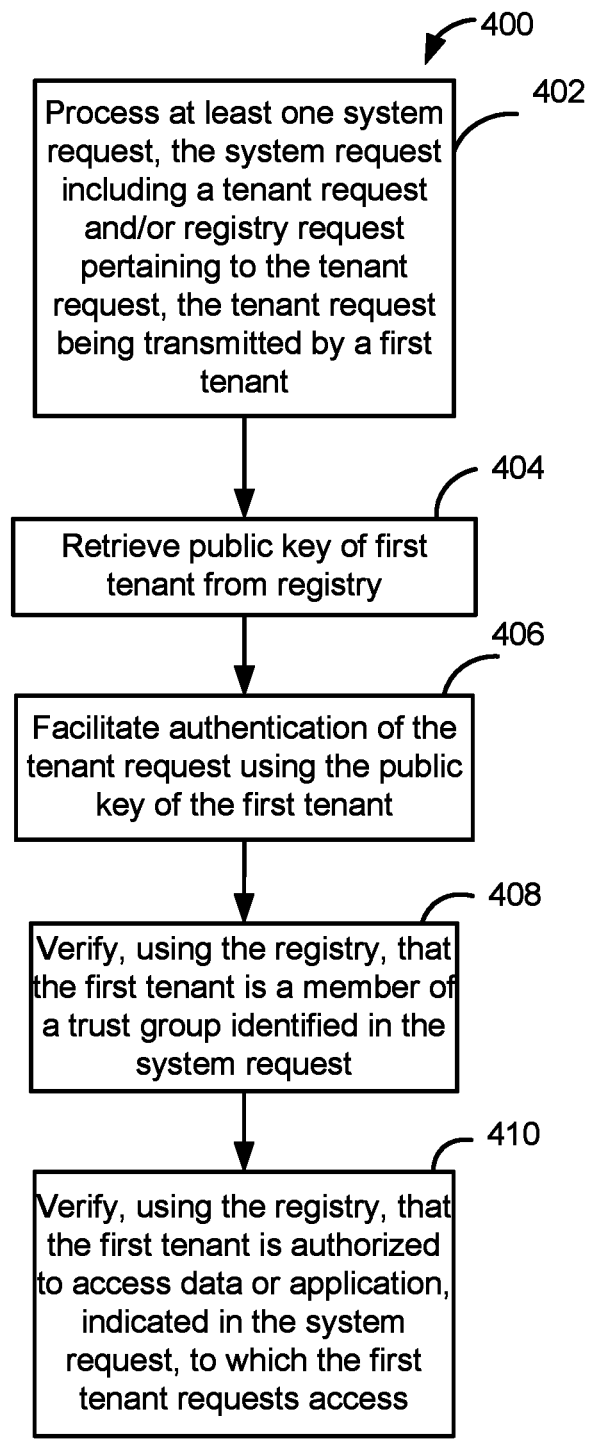
FIG. 4 shows an example of a method 400 for operating a registry to authenticate cross-tenant requests directed to a trust group, in accordance with some implementations.

FIG. 4 shows an example of a method 400 for operating a registry to authenticate cross-tenant requests directed to a trust group, in accordance with some implementations. An intermediate system processes at least one system request directed to or otherwise received by the intermediate system at 402. More particularly, the system request(s) may pertain to and/or include a tenant request transmitted by a computing system of a first tenant (e.g., requesting tenant) of a plurality of tenants of a database system.

In accordance with various implementations, the system request is received by the intermediate system from a sending tenant. For example, where the requesting tenant is unaware of the identity of the tenant in possession of the requested data or application, the requesting tenant may transmit a system request including the tenant request to the intermediate system. As another example, the target tenant may transmit a system request to the intermediate system to determine whether it should provide access to the requested data or application as indicated in the tenant request. In either instance, the system request may include the tenant request.

A system request may include a tenant request and/or a registry request. The system request(s) may also include an identifier of the first tenant and an identifier of a particular trust group to which the tenant request is directed. In addition, the system request(s) may include an indication of at least one of data or an application to which the first tenant requests access. Where the system request(s) is transmitted by the target tenant, the system request(s) may also identify the target tenant.

The intermediate system may authenticate the tenant request. More particularly, as shown in FIG. 4, the intermediate system may retrieve a public key of the first tenant at 404 from a registry. As described above, the registry can include metadata corresponding to the plurality of tenants, where the metadata of the registry indicates, for each of the tenants, a public key and any trust group memberships. In addition, the registry can include, for each of the tenants, a set of permissions.

The intermediate system may facilitate, using the public key of the first tenant, authentication of the tenant request at 406. More particularly, where the system request includes the tenant request, the intermediate system may apply the public key of the first tenant to authenticate the tenant request. Alternatively, where the system request includes a registry request, the intermediate system may either apply the public key or transmit the public key to the sending tenant of the registry request (e.g., target tenant) to enable the sending tenant to authenticate the tenant request.

The intermediate system may verify, using the registry, that the first tenant is a member of the particular trust group at 408. In addition, the intermediate system may verify, using the registry, whether the first tenant is authorized to access the data or application to which the first tenant requests access at 410.

A JSON web token may be transmitted by a requesting tenant and/or target tenant. In addition, a JSON web token may be transmitted by the directory service. In some implementations, a tenant request includes a JSON web token. In addition, in some implementations, a system request such as a registry request includes a JSON web token. For example, a registry request may include a tenant request. An example JSON web token will be described in further detail below.

Figure 5:
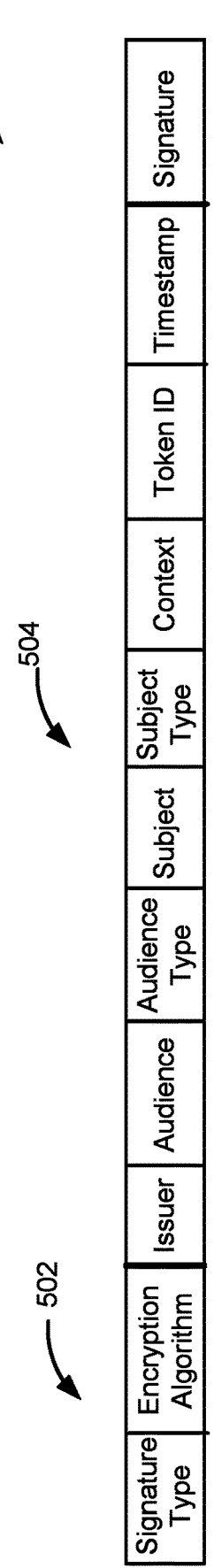
FIG. 5 shows an example of a JavaScript Object Notation (JSON) web token 500 used to facilitate tenant-registry communication and cross-tenant communication, in accordance with some implementations.

FIG. 5 shows an example of a JavaScript Object Notation (JSON) web token 500 used to facilitate tenant-registry communication and cross-tenant communication, in accordance with some implementations. JSON web token 500 includes a header 502 and payload 504. The header 502 can include an indication of a signature type and an indication of an encryption algorithm used to generate a signature for the web token. In some implementations, the encryption algorithm is used to encrypt the payload 502 or portion thereof.

The payload 504 can include an identifier of an issuer (source) of the JSON web token 500 and an identifier of the audience (destination) of the JSON web token 500. For example, where the JSON web token 500 includes a tenant request, the issuer field can include an identifier of the requesting tenant and the audience field can include an identifier of the target tenant. As another example, where the JSON web token 500 includes a registry request, the issuer field can include an identifier of the target tenant and the audience field can include an identifier of the directory service. As yet another example, the audience field can include an identifier of a trust group that includes multiple tenants.

In some implementations, the JSON web token 500 can include an audience type field. The audience type field may include a value that indicates an intended type of the audience (e.g., recipient) of the JSON web token 500. For example, the audience type field may indicate that the intended type of the recipient is a tenant. As another example, the audience type field may indicate that the intended type of the recipient is an intermediary receiving service that operates on behalf of a trust group identified within the audience field.

In some implementations, the JSON web token 500 can include a subject field. The subject field can include, for example, a user identifier of a user targeted by the tenant request.

In some implementations, the JSON web token 500 can include a subject type field. The subject type field may include a value that indicates a type of the subject identified within the subject field. For example, the subject type may indicate that the subject is a user identifier in the target system.

In some implementations, the JSON web token 500 can include a context field. The context field can include an indication of a context in which data is being requested from the target tenant. For example, the context field can include an identifier or API of an application of the requesting tenant, an identifier or API of an application of the target tenant, an identifier of a category of data (e.g., customers, leads, contacts), a identifier of a specific data record, and/or an identifier of a specific data field.

The payload 504 may further include a token identifier that uniquely identifies the JSON web token 500. In addition, the payload 504 can include a timestamp indicating a time that the JSON web token 500 was transmitted, as well as timestamp(s) indicating the validity period of the JSON web token.

The JSON web token 500 may also be encapsulated with a further header prior to transmitting the JSON web token. The further header can include a source identifier identifying the sending entity and a destination identifier identifying the receiving entity. For example, a target tenant may encapsulate a tenant request and transmit the encapsulated tenant request to the directory service.

In addition, the JSON web token may further include a digital signature. As discussed above, the digital signature may be generated by the sender of the JSON web token using the sender's private key. For example, a JSON web token may be generated by a requesting tenant using the requesting tenant's private key. The authenticity of the digital signature may subsequently be verified using the public key of the sender (e.g., requesting tenant).

The example shown and described with reference to FIG. 5 is merely illustrative. Therefore, the JSON web token 500 can further include additional or alternate fields not shown in this example, as well as fewer fields than those shown in this example.

In some but not all implementations, the disclosed methods, apparatus, systems, and computer program products may be configured or designed for use in a multi-tenant database environment. For example, a web page rendered by a browser at a user's client device may include data maintained by a multi-tenant database system. The term "multi-tenant database system" generally refers to those systems in which various elements of hardware and/or software of a database system may be shared by one or more customers. For example, a given application server may simultaneously process requests for a great number of customers, and a given database table may store records, which include rows of data, for a potentially much greater number of customers.

In some implementations, user profiles may be maintained in association with users of the system. An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level networking systems in conjunction with the disclosed techniques.

Figure 6A:
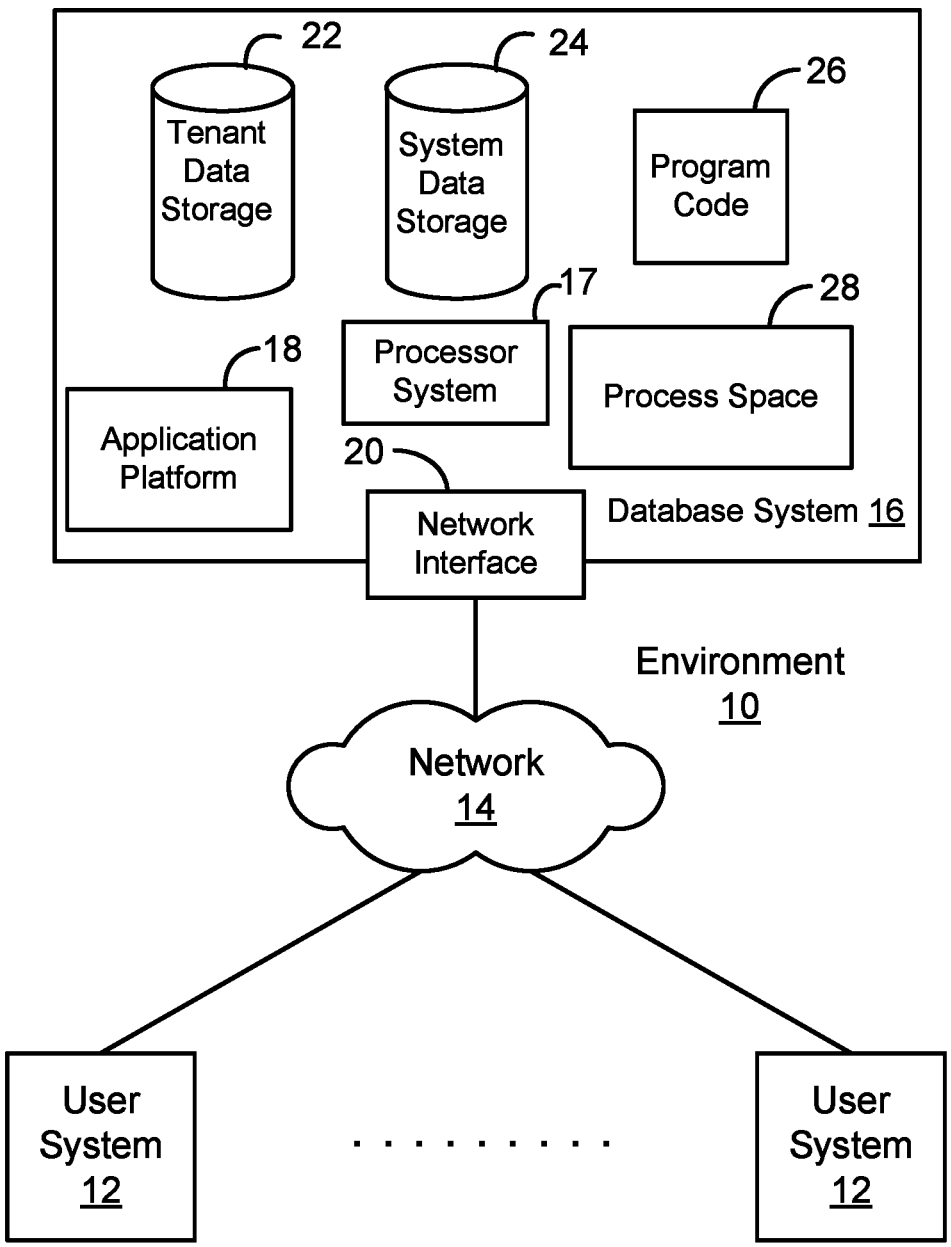
FIG. 6A shows a block diagram of an example of an environment 10 in which an on-demand database service can be used in accordance with some implementations.

FIG. 6A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 6B:
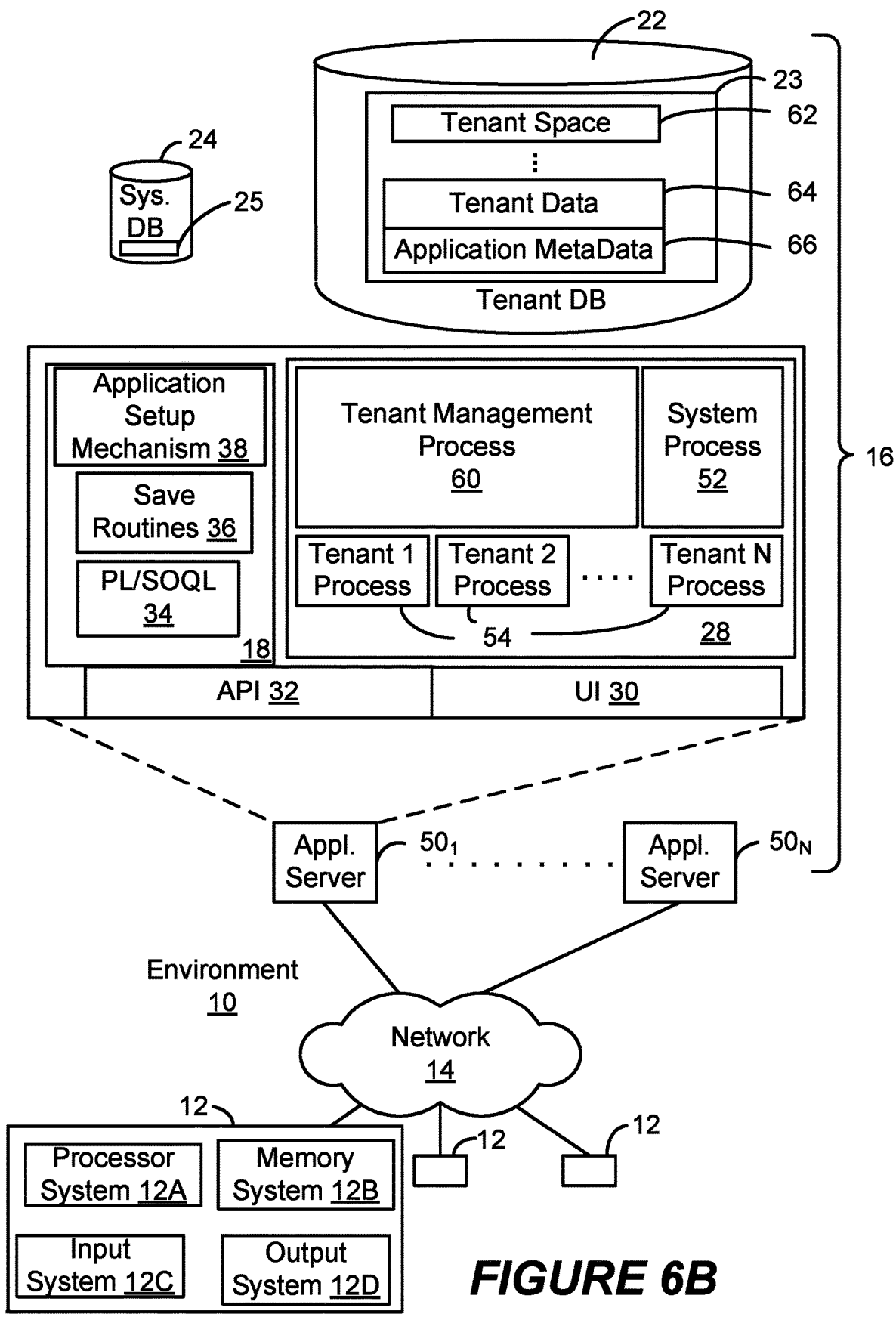
FIG. 6B shows a block diagram of an example of some implementations of elements of FIG. 8A and various possible interconnections between these elements.

One arrangement for elements of system 16 is shown in FIGS. 6A and 6B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, tablet, smartphone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of HTTP application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
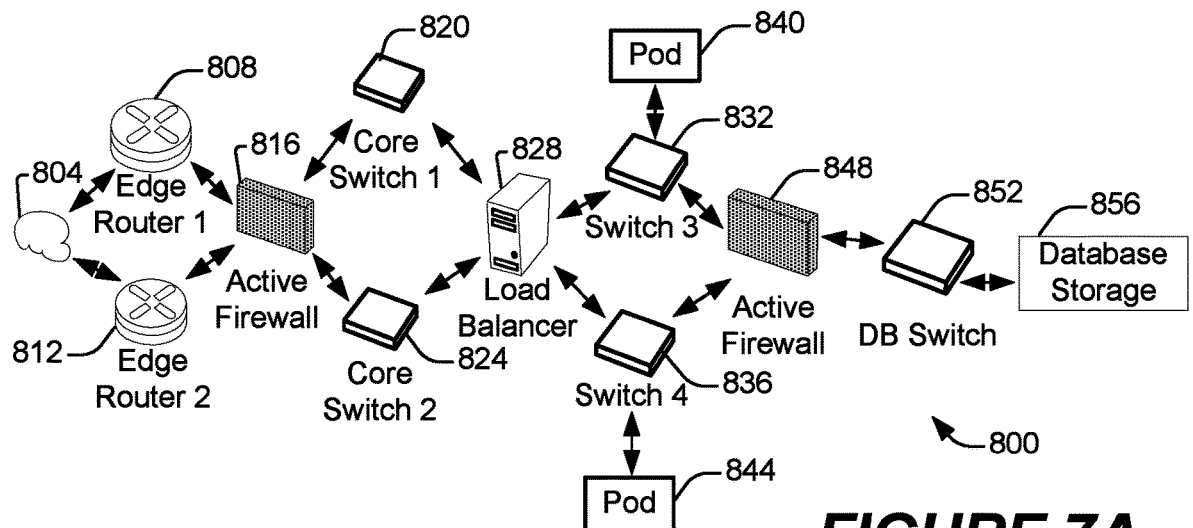
FIG. 7A shows a system diagram of an example of architectural components of an on-demand database service environment 900, in accordance with some implementations.

FIG. 7A shows a system diagram illustrating an example of architectural components of an on-demand database service environment 800 according to some implementations. A client machine located in the cloud 804, generally referring to one or more networks in combination, as described herein, may communicate with the on-demand database service environment via one or more edge routers 808 and 812. A client machine can be any of the examples of user systems 12 described above. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand database service environment may communicate with a database storage 856 via a database firewall 848 and a database switch 852.

Figure 7B:
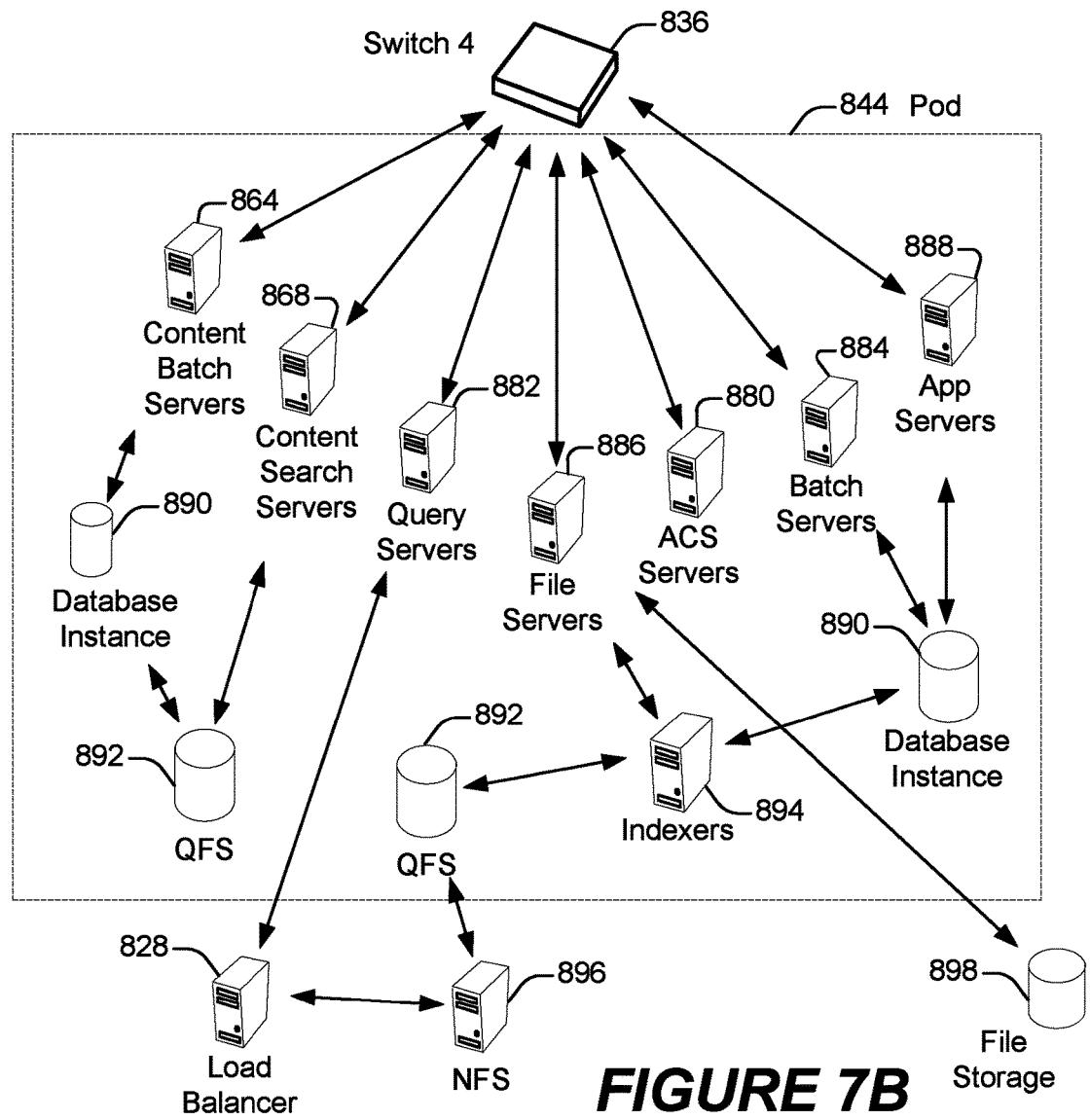
FIG. 7B shows a system diagram further illustrating an example of architectural components of an on-demand database service environment, in accordance with some implementations.

As shown in FIGS. 7A and 7B, accessing an on-demand database service environment may involve communications transmitted among a variety of different hardware and/or software components. Further, the on-demand database service environment 800 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand database service environment to access services provided by the on-demand database service environment. For example, client machines may access the on-demand database service environment to retrieve, store, edit, and/or process information.

In some implementations, the edge routers 808 and 812 route packets between the cloud 804 and other components of the on-demand database service environment 800. The edge routers 808 and 812 may employ the Border Gateway Protocol (BGP). The BGP is the core routing protocol of the Internet. The edge routers 808 and 812 may maintain a table of IP networks or 'prefixes', which designate network reachability among autonomous systems on the Internet.

In one or more implementations, the firewall 816 may protect the inner components of the on-demand database service environment 800 from Internet traffic. The firewall 816 may block, permit, or deny access to the inner components of the on-demand database service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand database service environment 800. The core switches 820 and 824 may be configured as network bridges that quickly route data between different components within the on-demand database service environment. In some implementations, the use of two or more core switches 820 and 824 may provide redundancy and/or reduced latency.

In some implementations, the pods 840 and 844 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage 856 may be conducted via the database switch 852. The multi-tenant database storage 856 may include more than one hardware and/or software components for handling database queries. Accordingly, the database switch 852 may direct database queries transmitted by other components of the on-demand database service environment (e.g., the pods 840 and 844) to the correct components within the database storage 856.

In some implementations, the database storage 856 is an on-demand database system shared by many different organizations. The on-demand database system may employ a multi-tenant approach, a virtualized approach, or any other type of database approach. An on-demand database system is discussed in greater detail with reference to FIGS. 7A and 7B.

FIG. 7B shows a system diagram further illustrating an example of architectural components of an on-demand database service environment according to some implementations. The pod 844 may be used to render services to a user of the on-demand database service environment 800. In some implementations, each pod may include a variety of servers and/or other systems. The pod 844 includes one or more content batch servers 864, content search servers 868, query servers 882, file servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the app servers 888 may include a hardware and/or software framework dedicated to the execution of procedures (e.g., programs, routines, scripts) for supporting the construction of applications provided by the on-demand database service environment 800 via the pod 844. In some implementations, the hardware and/or software framework of an app server 888 is configured to execute operations of the services described herein, including performance of the blocks of methods described with reference to FIGS. 1-4. In alternative implementations, two or more app servers 888 may be included and cooperate to perform such methods, or one or more other servers described herein can be configured to perform the disclosed methods.

The content batch servers 864 may handle requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand database service environment.

The file servers 886 may manage requests for information stored in the File storage 898. The File storage 898 may store information such as documents, images, and basic large objects (BLOBs). By managing requests for information using the file servers 886, the image footprint on the database may be reduced.

The query servers 882 may be used to retrieve information from one or more file systems. For example, the query system 882 may receive requests for information from the app servers 888 and then transmit information queries to the NFS 896 located outside the pod.

The pod 844 may share a database instance 890 configured as a multi-tenant environment in which different organizations share access to the same database. Additionally, services rendered by the pod 844 may call upon various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs.

In some implementations, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed.

In some implementations, queries from the query servers 822 may be transmitted to the NFS 896 via the load balancer 828, which may distribute resource requests over various resources available in the on-demand database service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without using an additional database call.

In some implementations, database information may be transmitted to the indexer 894. Indexer 894 may provide an index of information available in the database 890 and/or QFS 892. The index information may be provided to file servers 886 and/or the QFS 892.

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

The tracking and reporting of updates to a record stored in a database system can be facilitated with a multi-tenant database system 16, e.g., by one or more processors configured to receive or retrieve information, process the information, store results, and transmit the results. In other implementations, the tracking and reporting of updates to a record may be implemented at least partially with a single tenant database system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
receiving a tenant request transmitted by a computing system of a first tenant of a plurality of tenants of a database system, the tenant request including an identifier of the first tenant, an identifier of a particular trust group to which the tenant request is addressed, and an indication of at least one of data or an application to which the first tenant requests access;
performing a lookup in a registry to obtain a public key of the first tenant, the registry including metadata corresponding to the plurality of tenants, the metadata of the registry indicating, for each of the tenants, a public key and trust group memberships;
facilitating, using the public key of the first tenant, authentication of the tenant request;
verifying, using the registry, that the first tenant is a member of the particular trust group;
verifying, using the registry, that the first tenant is authorized to access the data or application to which the first tenant requests access;
selecting a member of the particular trust group that can provide access to the data or application, the selected member of the particular trust group being a second tenant of the plurality of tenants; and
forwarding the tenant request to a computing system of the second tenant.

2. The system as recited in claim 1, the database system further configurable to cause:
determining, from a type field of the tenant request, whether the tenant request is directed to a trust group.

3. The system as recited in claim 1, the database system further configurable to cause:
processing a system request received from the second tenant, the system request pertaining to or including the tenant request; and
facilitating authentication of the tenant request by transmitting the public key of the first tenant to the second tenant.

4. The system as recited in claim 1, the database system further configurable to cause:
processing a system request received from the second tenant, the system request including the tenant request; and
facilitating authentication of the tenant request by authenticating the tenant request using the public key of the first tenant.

5. The system as recited in claim 1, the database system further configurable to cause:
processing a system request received from the second tenant, the system request including a registry request identifying the first tenant and indicating a request for authentication of the tenant request; and
authenticating the registry request using a public key of the second tenant obtained from the registry.

6. The system as recited in claim 5, wherein the database system further configurable to cause:
performing at least one of facilitating authentication of the tenant request, verifying that the first tenant is a member of the particular trust group, or verifying that the first tenant is authorized to access the data or application responsive to processing the system request.

7. A computer program product comprising computer-readable program code capable of being executed by one or more processors when retrieved from a non-transitory computer-readable medium, the program code comprising computer-readable instructions configurable to cause:
receiving a tenant request transmitted by a computing system of a first tenant of a plurality of tenants of a database system, the tenant request including an identifier of the first tenant, an identifier of a particular trust group to which the tenant request is addressed, and an indication of at least one of data or an application to which the first tenant requests access;
performing a lookup in a registry to obtain a public key of the first tenant, the registry including metadata corresponding to the plurality of tenants, the metadata of the registry indicating, for each of the tenants, a public key and trust group memberships;
facilitating, using the public key of the first tenant, authentication of the tenant request;
verifying, using the registry, that the first tenant is a member of the particular trust group;
verifying, using the registry, that the first tenant is authorized to access the data or application to which the first tenant requests access;
selecting a member of the particular trust group that can provide access to the data or application, the selected member of the particular trust group being a second tenant of the plurality of tenants; and
forwarding the tenant request to a computing system of the second tenant.

8. The computer program product as recited in claim 7, the program code comprising instructions further configured to cause:
determining, from a type field of the tenant request, whether the tenant request is directed to a trust group.

9. The computer program product as recited in claim 7, the program code comprising instructions further configured to cause:

processing a system request received from the second tenant, the system request pertaining to or including the tenant request; and facilitating authentication of the tenant request by transmitting the public key of the first tenant to the second tenant.

10. The computer program product as recited in claim 7, the program code comprising instructions further configured to cause:

processing a system request received from the second tenant, the system request including the tenant request; and facilitating authentication of the tenant request by authenticating the tenant request using the public key of the first tenant.

11. The computer program product as recited in claim 7, the program code comprising instructions further configured to cause:

processing a system request received from the second tenant, the system request including a registry request identifying the first tenant and indicating a request for authentication of the tenant request; and authenticating the registry request using a public key of the second tenant obtained from the registry.

12. The computer program product as recited in claim 7, the program code comprising instructions further configured to cause:

performing at least one of facilitating authentication of the tenant request, verifying that the first tenant is a member of the particular trust group, or verifying that the first tenant is authorized to access the data or application responsive to processing the system request.

13. A method, comprising:

receiving a tenant request transmitted by a computing system of a first tenant of a plurality of tenants of a database system, the tenant request including an identifier of the first tenant, an identifier of a particular trust group to which the tenant request is addressed, and an indication of at least one of data or an application to which the first tenant requests access;

performing a lookup in a registry to obtain a public key of the first tenant, the registry including metadata corresponding to the plurality of tenants, the metadata of the registry indicating, for each of the tenants, a public key and trust group memberships;

facilitating, using the public key of the first tenant, authentication of the tenant request;

verifying, using the registry, that the first tenant is a member of the particular trust group;

verifying, using the registry, that the first tenant is authorized to access the data or application to which the first tenant requests access;

selecting a member of the particular trust group that can provide access to the data or application, the selected member of the particular trust group being a second tenant of the plurality of tenants; and forwarding the tenant request to a computing system of the second tenant.

14. The method as recited in claim 13, the method further comprising:

determining, from a type field of the tenant request, whether the tenant request is directed to a trust group.

15. The method as recited in claim 13, the method further comprising:

processing a system request received from the second tenant, the system request pertaining to or including the tenant request; and facilitating authentication of the tenant request by transmitting the public key of the first tenant to the second tenant from which the system request was received.

16. The method as recited in claim 13, further comprising:

processing a system request received from the second tenant, the system request including the tenant request; and:

authenticating the tenant request using the public key of the first tenant.

17. The method as recited in claim 13, the method further comprising:

processing a system request received from the second tenant, the system request including a registry request received from the second tenant, the registry request identifying the first tenant and indicating a request for authentication of the tenant request; and authenticating the registry request using a public key of the second tenant obtained from the registry.

* * * * *